March 30, 1926. Re. 16,306
A. P. ANDERSON
LUBRICATING SYSTEM
Original Filed Dec. 3, 1921
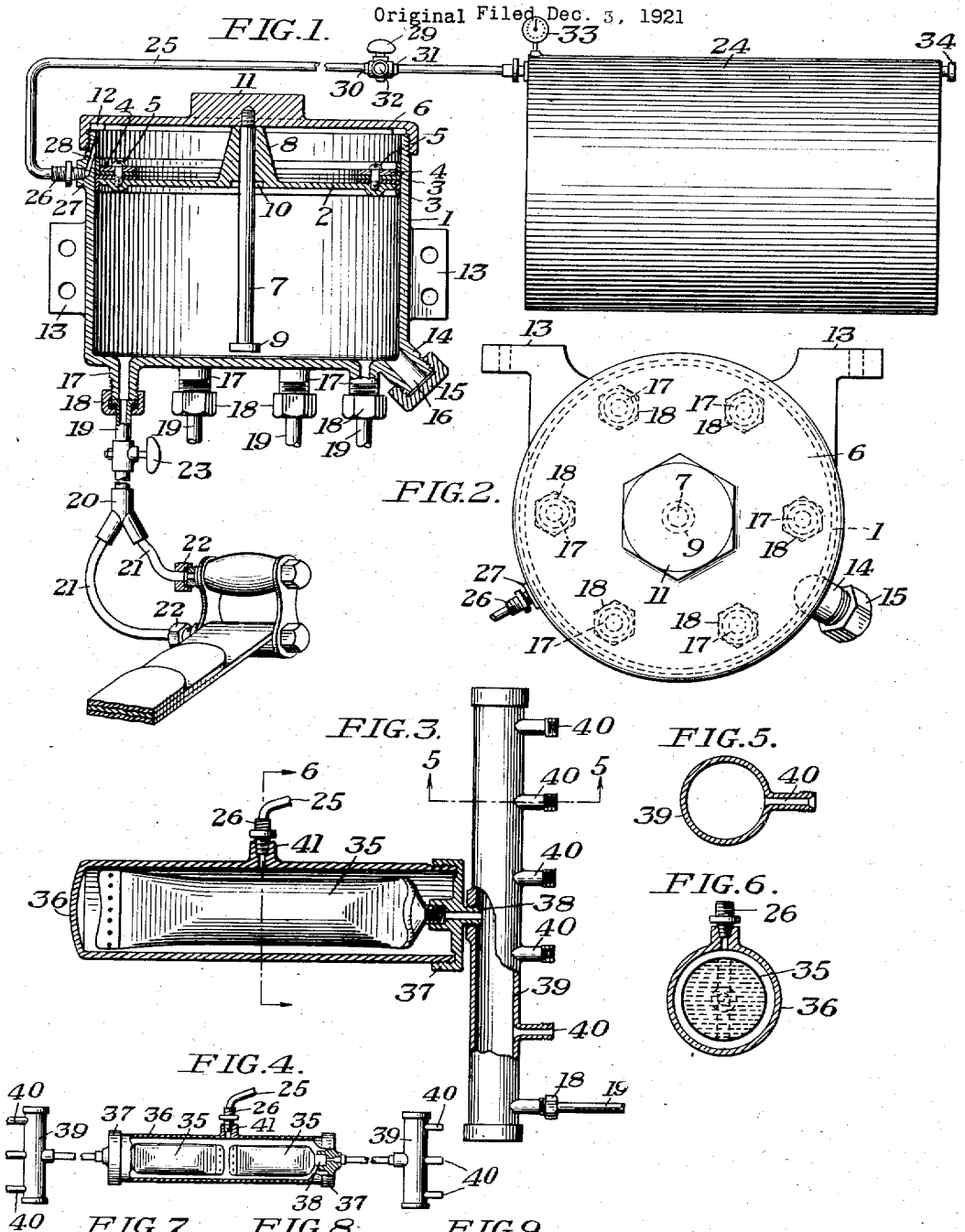
INVENTOR
Asoril P. Anderson
By Byrne, Stebbins & Parmelee
His Attys Reissued Mar. 30, 1926. Re. 16,306

UNITED STATES PATENT OFFICE.

AVERIL P. ANDERSON, OF BELLEVUE, PENNSYLVANIA.

LUBRICATING SYSTEM.

Original No. 1,465,620, dated August 21, 1923, Serial No. 519,669, filed December 3, 1921. Application for reissue filed November 3, 1923. Serial No. 672,670.

*To all whom it may concern:*

Be it known that I, AVERIL P. ANDERSON, a citizen of the United States, residing at Bellevue, in the county of Allegheny and State of Pennsylvania, have invented certain new and useful Improvements in Lubricating Systems, of which the following is a specification.

This invention relates to lubricating systems and more especially to centrally operated grease lubricating systems for use on automobiles.

One of the principal objects of this invention is to provide a lubricating system which enables all parts of an automobile to be lubricated by the automobile driver directly from his seat. Another object is to provide means for using fluid pressure to effect the lubrication of the various parts of the automobile. A further object is to provide means for regulating the amount of lubrication in relation to the requirements of the various parts to be lubricated. Still a further object is to provide a lubricating system which can be replenished with rapidity and without waste and which is of simple construction and operation. Further objects and advantages of my lubricating system will appear from the specification and drawings which form a part of this application.

In the drawings:

Figure 1 is a general view, partly in section, showing one application of my lubricating system.

Figure 2 is a top plan view of the grease container used in Figure 1.

Figure 3 is a representation, partly in section, of a modified construction of my lubricating system.

Figure 4 is another modification of my system which is a variation of the system shown in Figure 3.

Figure 5 represents a section taken on line 5—5 in Figure 3.

Figure 6 is a section taken along line 6—6 Figure 3.

Figures 7, 8, 9, are diagrammatic views showing various positions of an air control cock used in connection with my system.

Referring to Figures 1 and 2, my lubricating system consists of a grease container 1 provided with a piston 2 having the suitable leather cups 3 secured thereon by means of a metal ring 4 and the screws 5 inserted in the piston. Centrally of the screwed-on cover 6 is secured a guide-rod 7 which acts as a guide for the movements of the piston. A hub 8 is cast on the upper part of the piston to give a greater contact between the piston and the guide-rod. The latter has at its lower end a button 9 which may engage a depression 10 provided in the underside of the piston to permit the complete extrusion of the lubricant within the container. The purpose of this button is to prevent the piston from leaving the guide-rod and to enable the removal of said piston by means of the cover 6. This cover is applied to the grease container by means of the hexagonal head 11 cast integrally thereon; a suitable gasket 12 is also provided to insure a hermetic engagement between the cover and the container. The latter is provided with feet or lugs 13, by which it may be securely mounted at any suitable place on the automobile.

The lubricant may be introduced into the container either from the top by removing the cover 6 and the depending piston 2 or else from the bottom by connecting a grease-gun to the pipe connection 14 which is normally sealed by the cap 15 and the gasket 16.

The lubricating grease is fed to the various parts of the automobile which are to be lubricated by means of the numerous outlets 17 provided at the bottom of the grease container. As shown in Figure 1, the connection between said outlets and the parts to be lubricated is effected by means of the unions 18, the feed tubes 19, the pipe fittings 20, the branch tubes 21 which are connected to the parts to be lubricated in any suitable manner, such as by the unions 22. The feed and branch tubes are preferably made of small and flexible copper tubing, but if desired, any other suitable material may be used.

As the lubrication requirements vary for the different parts of an automobile, I provide, near or at the parts to be lubricated the cocks 23 which are opened more or less to suit the local conditions.

The lubricant is forced to the various parts by means of air pressure which is obtained from a high pressure air tank 24 connected to the grease container by means of the pipe 25 and the pipe nipple 26 which is screwed into the boss 27, provided outwardly of the container. As illustrated in Figure 1, the air is introduced above the piston through the obliquely drilled hole 28 which reaches near the top edge of the grease container. By using the construction just described, it will be seen that the cover 6 may be removed without affecting the air pipe connection to the container.

The air supply to the latter is established and regulated by means of a three-way cock 29 which allows the various connections diagrammatically illustrated in Figures 7 to 9 inclusive. In these figures, 30 is the pipe connection to the grease container, 31 is the connection to the air tank and 32 is an air vent. The position indicated in Figure 7 shows that the air tank and the grease container are directly connected; Figure 8 shows the air supply shut-off and the grease container "vented," that is, in communication with the atmosphere. Figure 9 indicates that both the air tank and the grease container are shut off.

The air tank is usually provided with a pressure gauge 33 and an inlet connection 34 through which air at high pressure is introduced into the tank. The air tank may be located at any suitable place on the automobile, but it is preferably positioned under the hood of the automobile and the air pipe 25 is so directed as to bring the three-way cock 29 on to the dash-board of the automobile so as to be within easy reach of the driver.

Figure 3, I have shown a modification of my lubricating system in which the piston mechanism has been eliminated and the general construction greatly simplified. Instead of filling the grease into the container, the former is supplied in a collapsible tube 35 which is inserted into an air-chamber 36 and screwed tightly into the cap-member 37 which connects by means of the threaded shank 38 to a manifold pipe 39 closed at both ends and provided with the desired number of grease-outlets 40, identical to those disclosed in Figure 1. The air pressure from the air tank is introduced into the air-chamber by the pipe 25 and nipple 26 screwed on to the boss 41 provided on the air chamber. As will be readily understood, when compressed air is introduced in the air-chamber, it will compress the collapsible tube and force the lubricant into the manifold until the collapsible tube is emptied. By flattening both ends of the collapsible tube as shown by shading in Figures 3 and 4, the tube will be collapsed substantially flat in the same plane as the ends and practically all the grease will be forced out.

The construction shown in Figure 4 differs from that of Figure 3 only in that the air chamber has been provided with two oppositely disposed collapsible grease tubes which supply individual manifold pipes 39. The compressed air is introduced in the air-chamber through a single pipe connection represented by the pipe 25 and the nipple 26. This arrangement is especially valuable when it is necessary to lubricate various parts with different kinds of lubricants, as is often the case in automobile practice.

Having described the most essential parts of my lubricating system, the operation thereof will be easily understood and is as follows: To lubricate the various parts of an automobile, the driver thereof turns the three-way cock in the position shown in Figure 7, thus introducing compressed air in the grease container 1, or the air-chamber 36, and forcing out the lubricant to the various parts of the machine. After a short time, judged sufficiently to supply the required lubrication, the three-way cock is turned in the position indicated by Figure 8, thus shutting off the supply of compressed air and relieving, or venting, the grease container. This venting is done for the purpose of preventing any waste of lubricant which would occur were the grease in the container left subject to the expansive force of the compressed air left therein, if the cock were turned directly in the full shut-off position illustrated in Figure 9.

In the above description, mention has been made of the use of my lubricating system with grease lubricant only and in connection with automobiles. It is evident that the system can be used as well with lubricating oils and in connection with any desired kind of machinery.

As will be understood, as suggested herein, there may be slight changes made in the construction and arrangement of the details of my invention without departing from the field and scope thereof, and I intend to include all such variations as fall within the scope of the appended claims.

I claim:

1. In a lubricating system, a plurality of parts to be lubricated, a header, a plurality of conduits connecting said parts to the header, and means for supplying lubricant under pressure to said header, said means comprising a fluid pressure chamber, a collapsible lubricant container positioned in said chamber and having a discharge opening communicating with the exterior thereof, a source of pressure fluid, means for establishing communication between the pressure source and the pressure chamber, and a connection on the header having an opening therein which communicates with the discharge opening of the lubricant container, substantially as described.

2. In a lubricating system for an automotive vehicle, a plurality of parts to be lubricated, a source of lubricant, a plurality of headers connected to the source by conduits, a single pressure means adapted to force lubricant to the several headers, and a plurality of conduits leading from the several headers to the parts to be lubricated, substantially as described.

3. In a lubricating system, a fluid pressure chamber, a collapsible lubricant container positioned in said chamber and having a discharge nozzle communicating with the exterior thereof, means for connecting said nozzle with the means to be lubricated, and a source of pressure fluid supply connected to said chamber and adapted to exert pressure on all sides of said container, the ends of said container being originally so shaped as to produce a longitudinal flattening thereof, substantially as described.

4. In a lubricating system, a fluid pressure chamber, a collapsible lubricant container positioned in said chamber and having a discharge nozzle communicating with the exterior thereof, means for connecting said nozzle with the means to be lubricated, a source of pressure fluid supply connected to said chamber and adapted to exert pressure on all sides of said container, the ends of said container being originally so shaped as to produce a longitudinal flattening thereof, and means for controlling the fluid pressure within said chamber, substantially as described.

5. In a lubricating system, a fluid pressure chamber, a collapsible lubricant container positioned in said chamber and having a discharge nozzle communicating with the exterior thereof, means for connecting said nozzle with the means to be lubricated, a source of pressure fluid supply connected to said chamber and adapted to exert pressure on all sides of said container, the ends of said container being originally so shaped as to produce a longitudinal flattening thereof, means for controlling the fluid pressure within said chamber, and means for controlling the discharge of lubricant from said container, substantially as described.

In testimony whereof, I have hereunto set my hand.

AVERIL P. ANDERSON.